US008705451B2

(12) United States Patent
Song et al.

(10) Patent No.: US 8,705,451 B2
(45) Date of Patent: Apr. 22, 2014

(54) APPARATUS AND METHOD FOR SWITCHING MIMO MODES IN A WIRELESS COMMUNICATION SYSTEM

(75) Inventors: Kuk Jin Song, Yongin-si (KR); Seung Hyun Lee, Seoul (KR); Hyung Joon Jeon, Seongnam-si (KR); Il Nyun Kim, Seongnam-si (KR); Kwang Sung Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 152 days.

(21) Appl. No.: 13/263,695

(22) PCT Filed: Apr. 5, 2010

(86) PCT No.: PCT/KR2010/002067
§ 371 (c)(1),
(2), (4) Date: Jan. 2, 2012

(87) PCT Pub. No.: WO2010/117169
PCT Pub. Date: Oct. 14, 2010

(65) Prior Publication Data
US 2012/0120873 A1   May 17, 2012

(30) Foreign Application Priority Data

Apr. 8, 2009   (KR) .................. 10-2009-0030266

(51) Int. Cl.
*H04W 4/00*  (2009.01)
(52) U.S. Cl.
USPC .......................................... 370/328; 375/267

(58) Field of Classification Search
USPC ........................................................ 370/328
See application file for complete search history.

(56) References Cited

U.S. PATENT DOCUMENTS

| | | | |
|---|---|---|---|
| 3,085,876 A | | 4/1963 | Alexander et al. |
| 2004/0082311 A1 | | 4/2004 | Shiu et al. |
| 2004/0176094 A1 | * | 9/2004 | Kim et al. ............... 455/438 |
| 2008/0084854 A1 | * | 4/2008 | Feder et al. ............. 370/338 |
| 2008/0113633 A1 | | 5/2008 | So |
| 2009/0034639 A1 | | 2/2009 | Hwang et al. |
| 2010/0227567 A1 | * | 9/2010 | Dinan et al. ............. 455/69 |
| 2012/0188881 A1 | * | 7/2012 | Ma et al. ................. 370/252 |

* cited by examiner

*Primary Examiner* — Huy D Vu
*Assistant Examiner* — Kevin Cunningham
(74) *Attorney, Agent, or Firm* — Sughrue Mion, PLLC

(57) ABSTRACT

Disclosed is an apparatus for switching MIMO modes, which can efficiently switch an MIMO mode of a mobile station. The apparatus for switching MIMO modes includes an MIMO mode determining unit, a staying time determining unit, and an MIMO mode switching unit. The MIMO mode determining unit determines a current MIMO mode of a mobile station. The staying time determining unit determines a first staying time in a first MIMO mode of the mobile station when the MIMO mode determining unit determines the current MIMO mode of the mobile station as the first MIMO mode for transmitting the same data through a plurality of antennas, and determines a second staying time in a second MIMO mode of the mobile station when the MIMO mode determining unit determines the current MIMO mode of the mobile station as the second MIMO mode for transmitting different data by antenna. The MIMO mode switching unit switches the MIMO mode of the mobile station to the second MIMO mode when the first staying time is greater than or equal to a first threshold staying time.

25 Claims, 4 Drawing Sheets

→ Staying FIRST MIMO MODE
--→ Staying SECOND MIMO MODE

| MCS | Mode A | Mode B |
|---|---|---|
| QPSK3/4 | 1.5 | 3 |
| 16QAM1/2 | 2 | 4 |
| 16QAM3/4 | 3 | 6 |
| 64QAM1/2 | 3 | 6 |
| 64QAM2/3 | 4 | 8 |
| 64QAM3/4 | 4.5 | 9 |
| 64QAM5/6 | 5 | 10 |

APPARATUS AND METHOD FOR SWITCHING MIMO MODES IN A WIRELESS COMMUNICATION SYSTEM

TECHNICAL FIELD

The present invention relates to a wireless communication system, and more particularly, to switching of Multi-Input Multi-Output (MIMO) modes in a wireless communication system.

BACKGROUND ART

Generally, under a wireless channel environment, information is lost because an inevitable error occurs due to various factors such as multi-path interference, shadowing, attenuation of the radio wave, time-varying noise, and fading. The loss of information acts as a factor that severely distorts an actually transmitted signal and thus degrades the entire performance of a wireless communication system.

A space diversity technique may be used for preventing the performance of a communication system from being degraded due to fading among the various factors. In the space diversity technique, a spatial domain for use of resources is additionally secured by disposing a plurality of antennas in a transmitting end and a receiving end. Therefore, the reliability of a communication link increases with a diversity gain without the increase in a bandwidth, and a transmission rate can increase through parallel transmission based on spatial multiplexing.

In a wireless communication system, a Single-Input Single-Output (SISO) system and an MIMO system are being generally used for transmitting data.

The SISO system is technology that transmits data over one channel (H) that is established between one transmitting antenna (TxAnt) and one receiving antenna (RxAnt), and since a transmitting end and a receiving end communicates with each other through one antenna, multi-path interference or fading occurs on a transmission path due to an obstacle such as a hill or a steel tower. Due to this reason, a data transmission speed decreases or a data transmission error increases.

Unlike this, in the MIMO system, a plurality of antennas are disposed in a transmitting end and a receiving antenna for transmitting data through several paths. The receiving end decreases interference because detecting a signal received through each path, and the transmitting end increases transmission efficiency through space-time diversity and spatial multiplexing. As an example, a 2×2 MIMO system uses two transmitting antennas and two receiving antennas. In such a 2×2 MIMO system, four channels (H11, H12, H21, and H22) are established between first and second transmitting antennas (TxAnt1 and TxAnt2) and first and second receiving antennas (RxAnt1 and RxAnt2).

An MIMO mode usable for the MIMO system is categorized into a Spatial Diversity (SD) mode and a Spatial Multiplexing (SM) mode according to a scheme of allocating a plurality of antennas and symbols to be transmitted, and particularly, a wireless communication system based on Institute of Electrical and Electronics Engineers (IEEE) 802.16 defines the selective use of the SD mode and SM mode. Herein, the SD mode denotes a technique that transmits the same data through a plurality of antennas, and the SM mode denotes a technique that transmits different data by antenna.

In determining an MIMO mode for a mobile station, the related art switches an MIMO mode of the mobile station from the SD mode to the SM mode when a Carrier to Interference Noise Ratio (CINR) value transmitted from the mobile station is greater than or equal to a threshold value, but when a Modulation and Coding Scheme (MCS) level of the mobile station is less than or equal to a threshold MCS level, the related art switches the MIMO mode of the mobile station from the SM mode to the SD mode.

Therefore, in a mobile station that has a CINR value greater than a threshold value in spite of low decoding capability, since the CINR value of the mobile station is greater than or equal to the threshold value when an MIMO mode of the mobile station is the SD mode, the related art switches the MIMO mode of the mobile station from the SD mode to the SM mode. However, in the SM mode, since the mobile station cannot normally decode received data because due to low decoding capability, an MCS level of the mobile station decreases inevitably, and thus, the related art again switches the MIMO mode of the mobile station from the SM mode to the SD mode.

Subsequently, the related art again switches the MIMO mode from the SD mode to the SM mode due to the CINR value in the SD mode, and again switches the MIMO mode from the SM mode to the SD mode because the MCS level decreases due to low decoding capability in the SM mode. Such an operation is repeatedly performed, and consequently, the MIMO mode of the mobile station is switched frequently.

In addition to such limitations, since the related art determines an MIMO mode of a corresponding mobile station with no consideration of frequency efficiency in each MIMO mode, communication efficiency is reduced.

DISCLOSURE

Technical Problem

Accordingly, the present invention is directed to provide an apparatus and method for switching MIMO modes in a wireless communication system that substantially obviate one or more problems due to limitations and disadvantages of the related art.

An aspect of the present invention is directed to provide an apparatus and method for switching MIMO modes, which can efficiently switch an MIMO mode of a mobile station.

Another aspect of the present invention is directed to provide an apparatus and method for switching MIMO modes, which determine whether to switch an MIMO mode of a mobile station, with a staying time of the mobile station in first and second MIMO modes.

Another aspect of the present invention is directed to provide an apparatus and method for switching MIMO modes, which extend a staying time of a mobile station in a first MIMO mode as the staying time of the mobile station in a second MIMO mode becomes shorter.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these and other advantages and in accordance with the purpose of the invention, as embodied and broadly described herein, there is provided an apparatus for switching MIMO modes including: an MIMO mode determining unit determining a current MIMO mode of a mobile station; a staying time determining unit determining a first staying time in a first MIMO mode of the mobile station and a second staying time in a second MIMO mode of the mobile station, wherein the staying time determining unit determines the first staying time when the MIMO mode determining unit determines the current MIMO mode of the mobile station as the first MIMO mode for transmitting the same data through a plurality of antennas, and determines the second staying time when the MIMO mode determining unit determines the current MIMO mode of the mobile station as the second MIMO mode for transmitting different data by antenna; and an MIMO mode switching unit switching the MIMO mode of the mobile station to the second MIMO mode when the first staying time is greater than or equal to a first threshold staying time.

In another aspect of the present invention, there is provided a method for switching MIMO modes including: determining a current MIMO mode of a mobile station; switching the MIMO mode of the mobile station to a second MIMO mode on the basis of a first staying time in a first MIMO mode when the current MIMO mode of the mobile station is the first MIMO mode, the second MIMO mode transmitting different data by antenna, and the first MIMO mode transmitting the same data through a plurality of antennas; and switching the MIMO mode of the mobile station to the first MIMO mode on the basis of an MCS level in the second MIMO mode, when the current MIMO mode of the mobile station is the second MIMO mode.

It is to be understood that both the foregoing general description and the following detailed description of the present invention are exemplary and explanatory and are intended to provide further explanation of the invention as claimed.

Advantageous Effects

According to embodiments, the present invention efficiently switches an MIMO mode of a mobile station, thus enhancing the performance of a communication system.

Moreover, the present invention determines whether to switch an MIMO mode of a mobile station with a staying time of the mobile station in first and second MIMO modes, in which case the present invention extends the staying time of the mobile station in the first MIMO mode as the staying time of the mobile station in the second MIMO mode becomes shorter. Accordingly, the present invention can prevent the MIMO mode of the mobile station from being frequently switched, thus enhancing communication efficiency.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an MIMO mode switching apparatus and method in a wireless communication system according to embodiments of the present invention will be described in detail with reference to the accompanying drawings.

Figure 1:
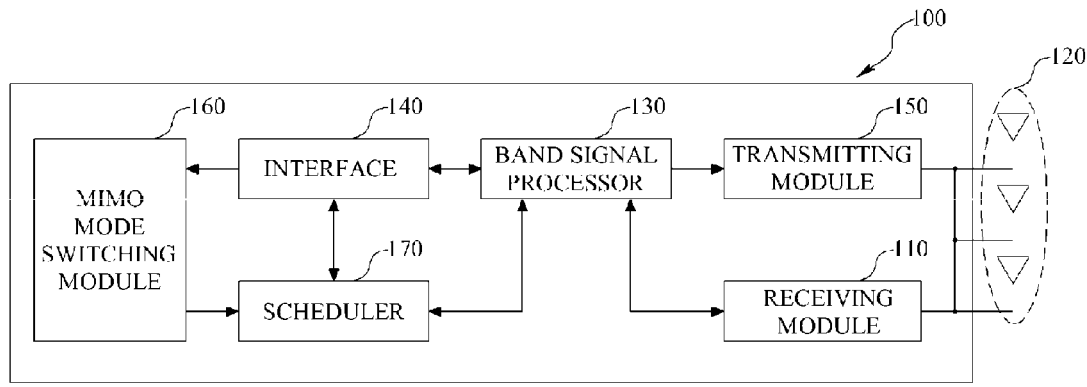
FIG. 1 is a block diagram schematically illustrating a configuration of a base station including an MIMO mode switching module according to an embodiment of the present invention.

FIG. 1 is a block diagram schematically illustrating a configuration of a base station including an MIMO mode switching module according to an embodiment of the present invention. Referring to FIG. 1, a base station 100 includes a receiving module 110, an antenna 120, a band signal processor 130, an interface 140, a transmitting module 150, an MIMO mode switching module 160, and a scheduler 170.

In a reception path, the receiving module 110 receives one or more wireless signals, respectively transmitted from one or more mobile stations, through the antenna 120 and converts the wireless signals into baseband signals. For example, the receiving module 110 removes noises from the wireless signals and amplifies the wireless signals, for data reception in the base station 100. Subsequently, the receiving module 110 down-converts the amplified signals into the baseband signals, and digitalizes the down-converted baseband signals.

An embodiment of the present invention is applied to an MIMO system, and thus, as illustrated in FIG. 1, the antenna 120 is implemented in plurality.

The band signal processor 130 extracts information or a data bit from each of the digitalized signals and performs a modulating operation, a decoding operation, and an error correcting operation. The received information is transferred to an adjacent wired/wireless network (not shown) via the interface 140, or again transmitted to other mobile stations, receiving service from the base station 100, through the below-described transmission path.

In the transmission path, the interface 140 receives voice, data, or control information from a control station (not shown) or a wireless network (not shown), and the band signal processor 230 encodes the voice, data, or control information to output the encoded voice, data, or control information to the transmitting module 150. The transmitting module 150 modulates the encoded voice, data, or control information into respective carrier signals having desired transmission frequencies or frequencies, and amplifies the modulated carrier signals to a level suitable for transmission to transmit the amplified carrier signals to the air through the antenna 120.

The MIMO mode switching module 160 determines an MIMO mode of a corresponding mobile station, on the basis of air information that is transmitted from the mobile station and transferred through the interface 140. Hereinafter, an MIMO mode switching module according to an embodiment of the present invention will be described in detail with reference to FIG. 2.

Figure 2:
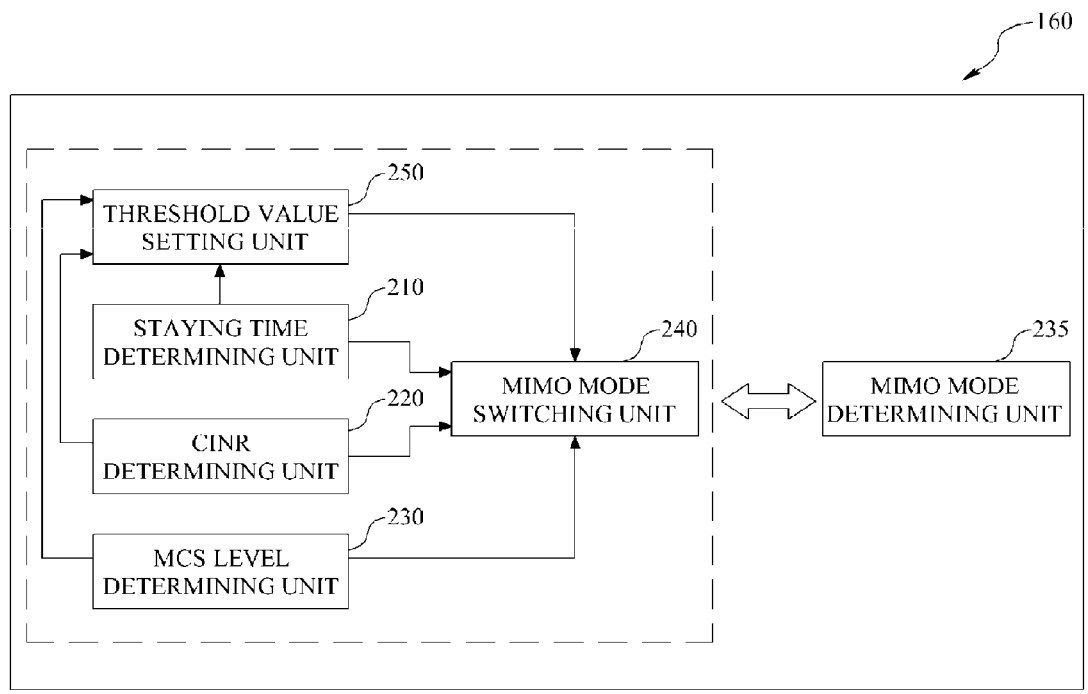
FIG. 2 is a block diagram schematically illustrating a configuration of an MIMO mode switching module of FIG. 1.

FIG. 2 is a block diagram schematically illustrating a configuration of an MIMO mode switching module of FIG. 1.

Referring to FIG. 2, the MIMO mode switching module 160 includes a staying time determining unit 210, a CINR determining unit 220, an MCS level determining unit 230, an MIMO mode determining unit 235, an MIMO mode switching unit 240, and a threshold value setting unit 250.

The staying time determining unit 210 determines a staying time of a mobile station in each MIMO mode, on the basis of information on a current MIMO mode of the mobile station that is received from the MIMO mode determining unit 235.

Specifically, when the current MIMO mode of the mobile station received from the MIMO mode determining unit 235 is a first MIMO mode for transmitting the same data through a plurality of antennas, the staying time determining unit 210 determines a first staying time that is a staying time of the mobile station in the first MIMO mode. When the current MIMO mode of the mobile station received from the MIMO mode determining unit 235 is a second MIMO mode for transmitting different data by antenna, the staying time determining unit 210 determines a second staying time that is a staying time of the mobile station in the second MIMO mode.

That is, the staying time determining unit 210 may determine the first staying time by calculating how much time the mobile station has stayed in the first MIMO mode for, and determine the second staying time by calculating how much time the mobile station has stayed in the second MIMO mode for.

In an embodiment, the staying time determining unit 210 may count the first staying time and second staying time with the number of Hybrid Automatic Repeat reQuest (HARQ) feedbacks transmitted from the mobile station. That is, by calculating the number of HAQR acknowledges (ACKs) or HAQR negative acknowledges (NACKs) transmitted from the mobile station, the staying time determining unit 210 may determine the first staying time and second staying time.

For example, when the mobile station is in the first MIMO mode, the first staying time is determined as 50 if fifty HARQ ACKs or HARQ NACKs are fed back from the mobile station. When the mobile station is in the second MIMO mode, the second staying time is determined as 10 if ten HARQ ACKs or HARQ NACKs are fed back from the mobile station.

The first staying time determined by the staying time determining unit 210 is used when the MIMO mode switching unit 240 switches the MIMO mode of the mobile station from the first MIMO mode to the second MIMO mode, and the second staying time is used when the threshold value setting unit 250 sets a first threshold staying time for switching the MIMO mode of the mobile station from the first MIMO mode to the second MIMO mode.

In this case, the first MIMO mode denotes an MIMO mode using an SD technique, and the second MIMO mode denotes an MIMO mode using an SM technique. Herein, as described above, the SD technique is a technique that increases stability of data transmission by transmitting the same data through a plurality of antennas, and the SM technique is a technique that increases an amount of transmitted data by transmitting different data by antenna. The SM technique may be used under a relatively better channel environment than the SD technique.

When the current MIMO mode of the mobile station received from the MIMO mode determining unit 235 is the first MIMO mode, the CINR determining unit 220 receives a CINR value transmitted from the mobile station through the interface 140 to determine the CINR value of the mobile station. The CINR value of the mobile station determined by the CINR determining unit 220 is used when the MIMO mode switching unit 240 switches the MIMO mode of the mobile station from the first MIMO mode to the second MIMO mode.

In the embodiment, the CINR determining unit 220 is described as an essential element, but the embodiment is not limited thereto. As another example, the MIMO mode switching unit 240 may directly receive the CINR value from the mobile station through the interface 140 to determine the CINR value, in which case the CINR determining unit 220 may be optionally included in the MIMO mode switching module 160.

When the current MIMO mode of the mobile station received from the MIMO mode determining unit 235 is the second MIMO mode, the MCS level determining unit 230 determines an MCS level of the mobile station, which is used when the MIMO mode switching unit 240 switches the MIMO mode of the mobile station from the second MIMO mode to the first MIMO mode.

The MIMO mode determining unit 235 determines the current MIMO mode of the mobile station and the switched MIMO mode of the mobile station, and when the initially set MIMO mode of the mobile station is switched by the below-described MIMO mode switching unit 240, the MIMO mode determining unit 235 receives the switched result from the MIMO mode switching unit 240 to determine the current MIMO mode of the mobile station. The MIMO mode determining unit 235 supplies information on the current MIMO mode of the mobile station to the above-described staying time determining unit 210, CINR determining unit 220, MCS level determining unit 230, and MIMO mode switching unit 240.

The MIMO mode switching unit 240 switches the MIMO mode of the mobile station with at least one of: the first staying time determined by the staying time determining unit 210; the CINR value of the mobile station received by the CINR receiving unit 220; and the MCS level of the mobile station determined by the MCS level determining unit 230.

Specifically, in a case where the current MIMO mode of the mobile station received from the MIMO mode determining unit 235 is the first MIMO mode, the MIMO mode switching unit 240 switches the MIMO mode of the mobile station from the first MIMO mode to the second MIMO mode when the first staying time determined by the staying time determining unit 210 is greater than or equal to the first threshold staying time and the CINR value of the mobile station received by the CINR determining unit 220 is a threshold CINR value, and transfers the switched result to the MIMO mode determining unit 235.

In an embodiment, since the first threshold staying time increases as the second staying time in the second MIMO mode of the mobile station becomes shorter, a time for which the mobile station is required to stay in the first MIMO mode increases as a time for which the mobile station has stayed in the second MIMO mode becomes shorter, thus preventing the frequent switching of the MIMO mode of the mobile station.

As described above, according to the embodiment, the MIMO mode switching unit 240 switches the MIMO mode of the mobile station in consideration of both the CINR value of the mobile station (which is determined in the first MIMO mode) and the first staying time that is a time for which the mobile station has stayed in the first MIMO mode. That is, although the CINR value of the mobile station is greater than or equal to the threshold CINR value, the MIMO mode switching unit 240 switches the MIMO mode to the second MIMO mode only when the mobile station has stayed in the first MIMO mode for a certain time.

Therefore, in the related art, an MIMO mode is switched to the second MIMO mode because a CINR value is greater than or equal to a threshold CINR value when a mobile station having the CINR value greater than a threshold value despite low decoding capability is in the first MIMO mode, and received data cannot normally be decoded because decoding capability is low when the mobile station is in the second MIMO mode, whereby the MIMO mode is again switched to the first MIMO mode, causing the frequent switching of the MIMO mode of the mobile station. However, according to the embodiment, even in a mobile station having a high CINR value despite low decoding capability, an MIMO mode is switched to the second MIMO mode when the first staying time in the first MIMO mode is greater than or equal to the first threshold staying time, and thus, the frequent switching of the MIMO mode can be prevented.

Moreover, in a case where the current MIMO mode of the mobile station received from the MIMO mode determining unit 235 is the second MIMO mode, the MIMO mode switching unit 240 switches the MIMO mode of the mobile station from the second MIMO mode to the first MIMO mode when the MCS level of the mobile station determined by the MCS level determining unit 230 is less than or equal to a threshold MCS level.

At this point, the threshold MCS level for the switch from the second MIMO mode to the first MIMO mode may be determined according to frequency efficiency of respective MCS levels in the first and second MIMO modes. Description on setting of the threshold MCS level will be made in detail together with the description of the threshold value setting unit 250.

Figure 3:
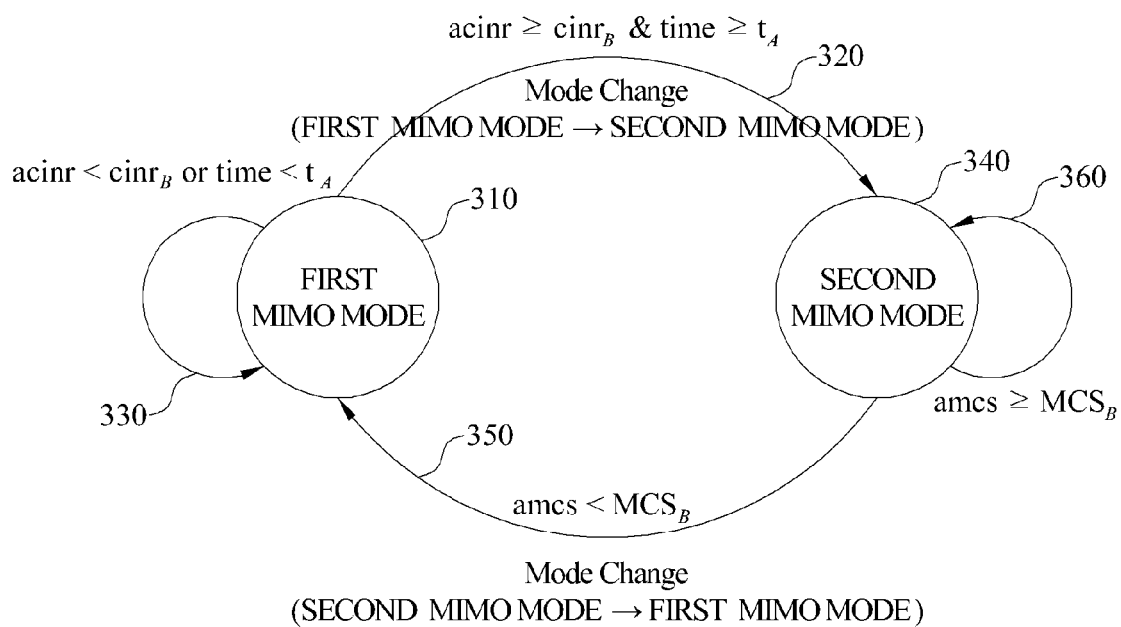
FIG. 3 is a diagram illustrating the schematization of an example where an MIMO mode switching unit of FIG. 2 switches an MIMO mode.

An example where the above-described MIMO mode switching unit 240 switches the MIMO mode of the mobile station will be briefly described below with reference to FIG. 3.

First, in a case where the MIMO mode of the mobile station determined by the MIMO mode determining unit 235 is the first MIMO mode in operation 310, the MIMO mode switching unit 240 switches the MIMO mode of the mobile station from the first MIMO mode to the second MIMO mode when the current CINR (acinr) of the mobile station is greater than or equal to a threshold CINR (cinrB) and a first staying time (time), for which the mobile station has stayed in the first MIMO mode, is greater than or equal to a threshold staying time (tA) in operation 320.

Accordingly, the MIMO mode switching unit 240 maintains the MIMO mode of the mobile station as the first MIMO mode when the current CINR (acinr) of the mobile station is less than or equal to the threshold CINR (cinrB) or the first staying time (time), for which the mobile station has stayed in the first MIMO mode, is less than or equal to the threshold staying time (tA) in operation 330.

Next, in a case where the MIMO mode of the mobile station determined by the MIMO mode determining unit 235 is the second MIMO mode in operation 340, the MIMO mode switching unit 240 switches the MIMO mode of the mobile station from the second MIMO mode to the first MIMO mode when a current MCS level (amcs) of the mobile station is less than a threshold MCS level (MCSB) in operation S350. Therefore, when the current MCS level (amcs) of the mobile station is greater than or equal to the threshold MCS level (MCSB), the MIMO mode switching unit 240 maintains the MIMO mode of the mobile station as the second MIMO mode in operation 360.

Referring again to FIG. 2, when the MIMO mode of the mobile station is switched from the first MIMO mode (previous first MIMO mode) to the second MIMO mode and then switched from the second MIMO mode to the first MIMO mode (current first MIMO mode), the threshold value setting unit 250 sets the first threshold staying time in the current first MIMO mode with the second staying time for which the mobile station has stayed in the second MIMO mode.

According to an embodiment, in setting a first threshold staying time in the current first MIMO mode, the threshold value setting unit 250 determines whether the second staying time, for which the mobile station has stayed in the second MIMO mode, is less than or equal to the second threshold staying time, and when the second staying time is determined as less than or equal to the second threshold staying time, the threshold value setting unit 250 may increase a first threshold staying time in the previous first MIMO mode by a certain value to set the first threshold staying time in the current first MIMO mode. In this case, in order to prevent the frequent switching of the MIMO mode of the mobile station, the second threshold staying time may be set shorter than an initial first threshold staying time.

For example, the threshold value setting unit 250 may increase the first threshold staying time in the previous first MIMO mode by a certain value to set the first threshold staying time in the current first MIMO mode because the second staying time is less than or equal to the second threshold staying time, when it is determined by the MIMO mode determining unit 235 that the MIMO mode of the mobile station is switched from the first MIMO mode to the second MIMO mode and then switched from the second MIMO mode to the first MIMO mode, the second threshold staying time has been set as 20, and it is determined by the staying time determining unit 210 that the second staying time is 10 in the second MIMO mode of the mobile station.

In this way, in the above-described embodiment, when the second staying time for which the mobile station has stayed in the second MIMO mode is shorter than the second threshold staying time, the threshold value setting unit 250 increases the first threshold staying time in the previous first MIMO mode by a predetermined value, and thus increases a time for which the mobile station is required to stay in the first MIMO mode after the MIMO mode of the mobile station is switched from the second MIMO mode to the first MIMO mode, thereby preventing the frequent switching of the MIMO mode.

According to another embodiment, in setting the first threshold staying time in the current first MIMO mode, the threshold value setting unit 250 may set the greater value of a minimum first threshold staying time and a value that is obtained by multiplying a certain weight value and the sum of a difference (between the second threshold staying time and the second staying time for which the mobile station has stayed in the second MIMO mode) and the first threshold staying time of the mobile station in the previous first MIMO mode, as the first threshold staying time in the current first MIMO mode. Even in this case, in order to prevent the frequent switching of the MIMO mode of the mobile station, the second threshold staying time may be set shorter than the initial first threshold staying time.

For example, it is assumed that the MIMO mode of the mobile station is determined by the MIMO mode determining unit 235 as switched from the first MIMO mode to the second MIMO mode and then switched from the second MIMO mode to the first MIMO mode, the minimum first threshold staying time is set as TA, and the second threshold staying time is set as TB.

In this case, a first threshold staying time "$t_A(1)$" in the current first MIMO mode may be set as the greater value of a minimum first threshold staying time "$T_A$" and a value that is obtained by multiplying a certain weight value "$\Delta T$" and the sum of a difference (between a second threshold staying time "$T_B$" and a second staying time "$t_B(0)$" for which the mobile station has stayed in the second MIMO mode) and a first threshold staying time "$t_A(0)$" in the previous first MIMO mode. The first threshold staying time "$t_A(1)$" is expressed as Equation (1) below.

$$t_A(1)=\max\{t_A(0)+(T_B-t_B(0))\Delta T, T_A\} \quad \text{[Equation 1]}$$

As described above, even in the above description, in consideration of the second staying time for which the mobile station has stayed in the second MIMO mode, the first threshold staying time in the current first MIMO mode increases as the second staying time becomes shorter, and thus, the threshold value setting unit 250 increases a time for which the mobile station is required to stay in the current first MIMO mode after the MIMO mode of the mobile station is again switched from the second MIMO mode to the first MIMO mode, thereby preventing the frequent switching of the MIMO mode.

Moreover, when the MIMO mode of the mobile station is switched from the first MIMO mode to the second MIMO mode and then again switched from the second MIMO mode to the first MIMO mode, the threshold value setting unit 250 resets a threshold CINR value in the current first MIMO mode of the mobile station with the second staying time for which the mobile station has stayed in the second MIMO mode.

According to an embodiment, in setting the threshold CINR value in the current first MIMO mode, the threshold value setting unit 250 determines whether the second staying time, for which the mobile station has stayed in the second MIMO mode, is less than or equal to the second threshold staying time, and when the second staying time is determined as less than or equal to the second threshold staying time, the threshold value setting unit 250 may increase a threshold CINR value in the previous first MIMO mode by a certain value to set the threshold CINR value in the current first MIMO mode.

According to a second embodiment, in setting the threshold CINR value in the current first MIMO mode, the threshold value setting unit 250 may set the greater value of a minimum threshold CINR value and a value that is obtained by multiplying a certain weight value and the sum of a difference (between the second threshold staying time and the second staying time for which the mobile station has stayed in the second MIMO mode) and the threshold CINR value in the previous first MIMO mode, as the threshold CINR value in the current first MIMO mode. The threshold CINR value is expressed as Equation (2) below.

$$cinr_B(1)=\max\{cinr_B(0)+(T_B-t_B(0))\Delta CINR, CINR_B\} \quad \text{[Equation 2]}$$

where $cinr_B(1)$ indicates the threshold CINR value in the current first MIMO mode, $CINR_B$ indicates the minimum threshold CINR, $T_B$ indicates the second threshold staying time, $t_B(0)$ indicates the second staying time for which the mobile station has stayed in the second MIMO mode, $cinr_B(0)$ indicates the threshold CINR value in the previous first MIMO mode, and $\Delta CINR$ indicates a certain weight value.

As described above, identically to the first threshold staying time, when the second staying time for which the mobile station has stayed in the second MIMO mode is shorter than the second threshold staying time, the threshold value setting unit 250 increases the threshold CINR value in the previous first MIMO mode by a predetermined value, and thus sets the threshold CINR value in the current first MIMO mode, thereby preventing the frequent switching of the MIMO mode.

Moreover, the threshold CINR value in the current first MIMO mode increases as the second staying time for which the mobile station has stayed in the second MIMO mode becomes shorter, thus preventing the frequent switching of the MIMO mode.

Figures 4, 5:
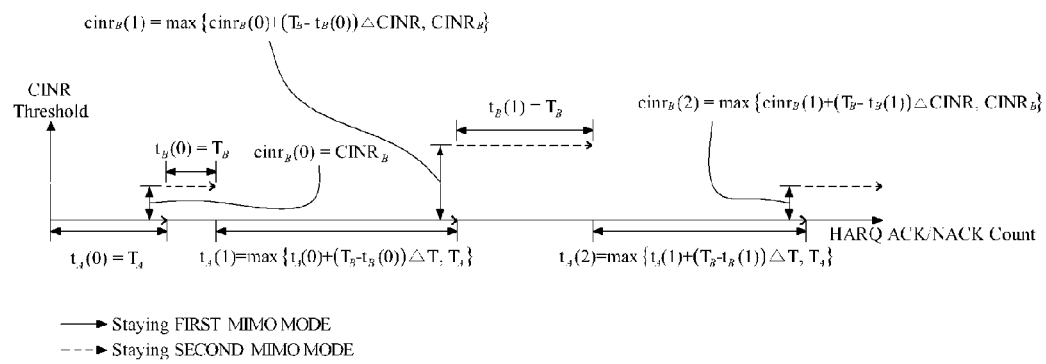
FIG. 4 is a diagram illustrating an example where a threshold value setting unit of FIG. 2 resets a first threshold staying time and a threshold CINR value.
FIG. 5 is a diagram showing frequency efficiency of MCS levels in first and second MIMO modes.

A method where the threshold value setting unit 250 sets the first threshold staying time and the threshold CINR value in the current first MIMO mode is schematized as shown in FIG. 4. As seen in FIG. 4, when the MIMO mode of the mobile station is switched from the first MIMO mode to the second MIMO mode and then switched from the second MIMO mode to the first MIMO mode, the first threshold staying time for which the mobile station is required to stay in the first MIMO mode increases as the second staying time being a time for which the mobile station has stayed in the second MIMO mode becomes shorter, and the threshold CINR value in the first MIMO mode increases.

The threshold value setting unit 250 may determine a threshold MCS level that is used for the switch from the second MIMO mode to the first MIMO mode. In an embodiment, the threshold value setting unit 250 may determines an MCS level, having the minimum frequency efficiency among a plurality of MCS levels in the second MIMO mode which has frequency efficiency greater than frequency efficiencies by MCS level in the first MIMO mode, as the threshold MCS level.

For example, as illustrated in FIG. 5, since the greatest value of frequency efficiencies of respective MCS levels in the first MIMO mode is 5, the threshold value setting unit 250 may determine 16 Quadrature Amplitude Modulation (QAM) 3/4, having the minimum frequency efficiency of 6 among 16 QAM 3/4, 64 QAM 1/2, 64 QAM 2/3, 64 QAM 3/4, and 64 QAM 5/6 that are MCS levels having frequency efficiency greater than 5 among MCS levels in the second MIMO mode, as the threshold MCS level.

Referring again to FIG. 1, the scheduler 170 controls an operation of the reception path and an operation of the transmission path. Specifically, the scheduler 170 allocates data, which will be transmitted to respective mobile stations through the transmission path, in a burst type and thus configures a frame to be transmitted to each mobile station. At this point, the scheduler 170 configures a frame to be transmitted to each mobile station, based on the MIMO mode determined by the MIMO mode switching module 160.

Hereinafter, an MIMO mode switching method according to an embodiment of the present invention will be described in detail with reference to FIG. 6.

Figure 6:
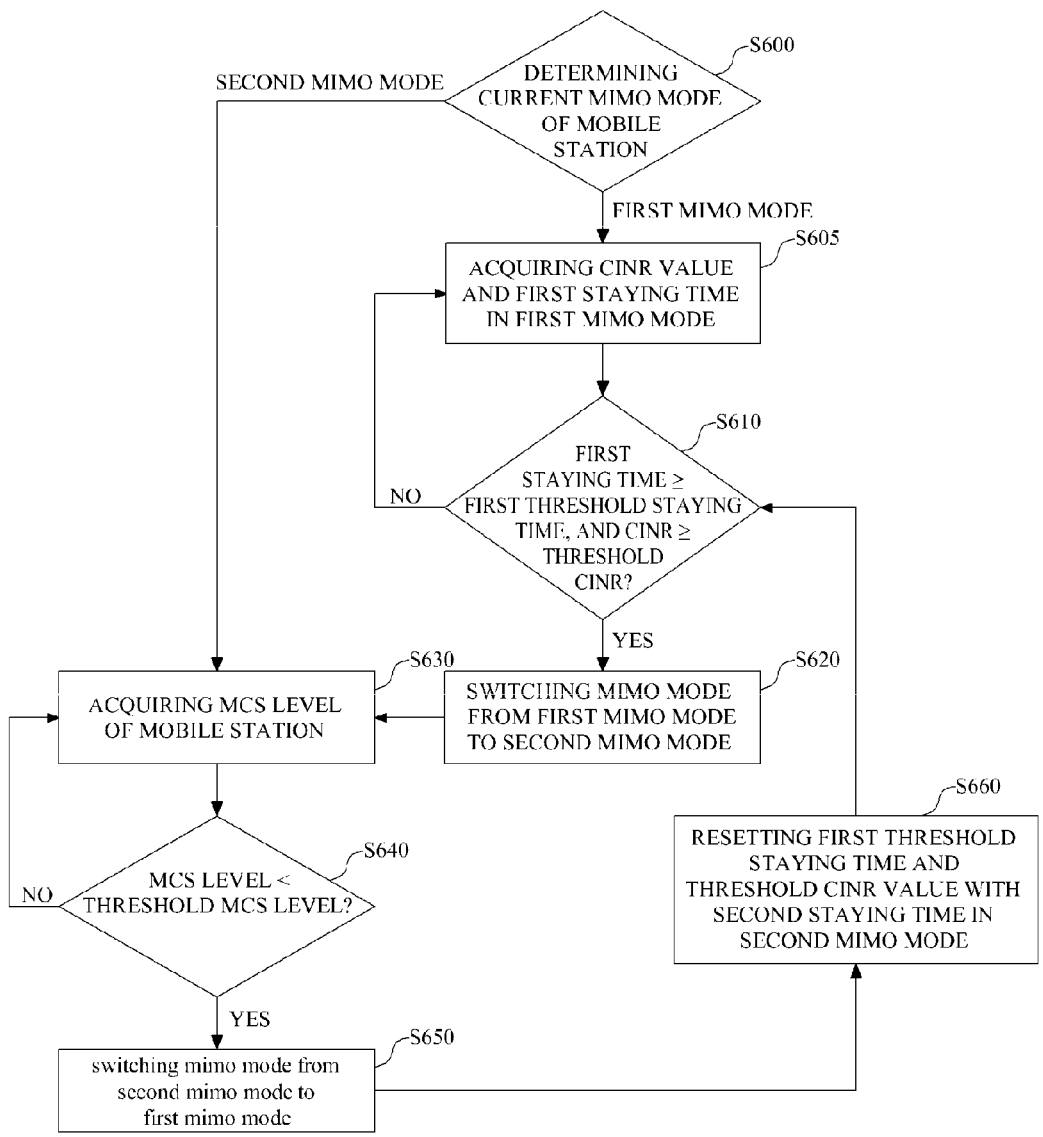
FIG. 6 is a flowchart illustrating an MIMO mode switching method according to an embodiment of the present invention.

FIG. 6 is a flowchart illustrating an MIMO mode switching method according to an embodiment of the present invention.

Referring to FIG. 6, first, the MIMO mode switching apparatus determines a current MIMO mode of a mobile station in operation S600. When the determined result shows that the current MIMO mode of the mobile station is a first MIMO mode, the MIMO mode switching apparatus acquires a first staying time being a time for which the mobile station has stayed in the first MIMO mode and a CINR value of the mobile station in operation S605. In an embodiment, the first staying time may be counted with the number of HARQ feedbacks (HARQ ACKs/NACKs) transmitted from the mobile station.

Subsequently, the MIMO mode switching apparatus determines whether the acquired first staying time is greater than or equal to a first threshold staying time and the acquired CINR value is greater than or equal to a threshold CINR value in operation S610.

When the determined result shows that the acquired first staying time is greater than or equal to the first threshold staying time and the acquired CINR value is greater than or equal to the threshold CINR value, the MIMO mode switching apparatus switches the MIMO mode of the mobile station from the first MIMO mode to a second MIMO mode in operation S620. Herein, the first MIMO mode denotes an MIMO mode using the SD technique, and the second MIMO mode denotes an MIMO mode using the SM technique.

When the determined result of operation S610 shows that the acquired first staying time is less than or equal to the first threshold staying time and the acquired CINR value is less than or equal to the threshold CINR value, the MIMO mode switching apparatus continuously maintains the first MIMO mode until the acquired first staying time becomes greater than or equal to the first threshold staying time and the acquired CINR value becomes greater than or equal to the threshold CINR value, without switching the current MIMO mode.

Subsequently, when the MIMO mode of the mobile station is determined as the second MIMO mode in operation S600, or after the MIMO mode of the mobile station is switched to the second MIMO mode in operation S620, the MIMO mode switching apparatus acquires an MCS level of the mobile station in operation S630. Afterward, the MIMO mode switching apparatus determines whether the acquired MCS level of the mobile station is less than or equal to the threshold MCS level in operation S640. In an embodiment, the MIMO mode switching apparatus may determine an MCS level, having the minimum frequency efficiency among MCS levels in the second MIMO mode that have frequency efficiency greater than frequency efficiencies of respective MCS levels in the first MIMO mode, as the threshold MCS level.

When the determined result shows that the MCS level of the mobile station is less than the threshold MCS level, the MIMO mode switching apparatus switches the MIMO mode of the mobile station from the second MIMO mode to the first MIMO mode in operation S650. In this case, the MIMO mode switching apparatus may determine the second staying time for which the mobile station has stayed in the second MIMO mode, and store the determined time.

When the determined result of operation S640 shows that the MCS level of the mobile station is greater than or equal to the threshold MCS level, the MIMO mode switching apparatus maintains the second MIMO mode without switching the MIMO mode.

In operation S660, thereafter, the MIMO mode switching apparatus sets the first threshold staying time and threshold CINR value in the current first MIMO mode, with the second staying time in the second MIMO mode of the mobile station.

First, when the second staying time is less than or equal to the second threshold staying time, the MIMO mode switching apparatus may increase a first threshold staying time in a previous first MIMO mode by a certain value, or set the greater value of a minimum first threshold staying time and the sum of a difference (between the second staying time and the second threshold staying time) and a first threshold staying time in the previous first MIMO mode, as the first threshold staying time.

Next, when the second staying time is less than or equal to the second threshold staying time, the MIMO mode switching apparatus may increase a previous threshold CINR value by a certain value, or set the greater value of a minimum threshold CINR value and the sum of a difference (between the second staying time and the second threshold staying time) and a threshold CINR value in the previous first MIMO mode, as the threshold CINR value in the current first MIMO mode.

A description on setting of the first threshold staying time and threshold CINR value in the current first MIMO mode has been made in detail in the description of the threshold value setting unit 250, and thus, its detailed description is not provided.

The above-described MIMO mode switching method may be realized in a program command type executable in computers and stored in a computer-readable record medium. Herein, the computer-readable record medium may include a program command, a data file, and a data structure individually, or include the combination thereof. Furthermore, program commands stored in the record medium may be designed and constructed particularly for the present invention, or known to those skilled in computer software and usable.

The computer-readable record medium is any data storage device that can store data which can be thereafter read by a computer system. Examples of the computer-readable record medium include ROMs, RAMs, CD-ROMs, DVDs, magnetic tapes, floppy disks, registers, buffers, optical data storage devices, and carrier waves (such as data transmission through the Internet). Such a record medium may be a transmission medium, which includes a carrier for transmitting a signal designating a program command and a data structure, such as light, a metal line, or a wave guide.

Moreover, the program command includes a high-level code, which is executable in computers by using an interpreter, as well as a machine code such as being generated by a compiler. The above-described hardware apparatus may be configured to function as one or more software modules for performing the operation of the present invention, and the reverse is similar thereto.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An apparatus for switching Multi-Input Multi-Output (MIMO) modes, the apparatus comprising:
   an MIMO mode determining unit determining a current MIMO mode of a mobile station;
   a staying time determining unit determining a first staying time in a first MIMO mode of the mobile station and a second staying time in a second MIMO mode of the mobile station, wherein the staying time determining unit determines the first staying time when the MIMO mode determining unit determines the current MIMO mode of the mobile station as the first MIMO mode for transmitting the same data through a plurality of antennas, and determines the second staying time when the MIMO mode determining unit determines the current MIMO mode of the mobile station as the second MIMO mode for transmitting different data by antenna;
   an MIMO mode switching unit switching the MIMO mode of the mobile station to the second MIMO mode when the first staying time is greater than or equal to a first threshold staying time;
   a CINR determining unit determining a CINR value of the mobile station received from the mobile station; and
   a threshold value setting unit resetting a threshold CINR value by increasing the threshold CINR value by a certain value when the second staying time is less than or equal to a second threshold staying time,
   wherein the MIMO mode switching unit switches the MIMO mode of the mobile station to the second MIMO mode when the first staying time is greater than the first threshold staying time and the CINR value is greater than the threshold CINR value.

2. The apparatus of claim 1, wherein the staying time determining unit counts the first staying time and second staying time by counting the number of Hybrid Automatic Repeat reQuest (HARQ) feedbacks transmitted from the mobile station.

3. The apparatus of claim 1, further comprising a threshold value setting unit resetting the first threshold staying time, with the second staying time in the second MIMO mode of the mobile station.

4. The apparatus of claim 1, further comprising a threshold value setting unit resetting the first threshold staying time by increasing the first threshold staying time by a certain value when the second staying time is less than or equal to a second threshold staying time.

5. The apparatus of claim 1, further comprising a threshold value setting unit resetting the greater value of a minimum first threshold staying time and a value, which is obtained by adding a difference between the second staying time and a second threshold staying time to the first threshold staying time of the mobile station in the first MIMO mode immediately before being switched to the second MIMO mode, as the first threshold staying time.

6. The apparatus of claim 4, wherein the second threshold staying time is less than or equal to the first threshold staying time.

7. The apparatus of claim 1, further comprising a threshold value setting unit resetting the threshold CINR value by using the second staying time, when the current MIMO mode of the mobile station is again switched from the second MIMO mode to the first MIMO mode.

8. The apparatus of claim 1, further comprising a threshold value setting unit resetting the greater value of a minimum threshold CINR value and a value, which is obtained by using a difference between the second staying time and a second threshold staying time to the threshold CINR value of the mobile station in the first MIMO mode immediately before being switched to the second MIMO mode, as the threshold CINR value.

9. The apparatus of claim 1, further comprising an MCS level determining unit determining an MCS level of the mobile station when the MIMO mode determining unit determines the current MIMO mode of the mobile station as the second MIMO mode,
wherein the MIMO mode switching unit switches the MIMO mode of the mobile station from the second MIMO mode to the first MIMO mode when the MCS level of the mobile station is less than a threshold MCS level.

10. The apparatus of claim 9, further comprising a threshold value setting unit determining the threshold MCS level according to frequency efficiencies in the first and second MIMO modes.

11. The apparatus of claim 9, further comprising a threshold value setting unit determining an MCS level, having a minimum frequency efficiency among MCS levels in the second MIMO mode which have frequency efficiency greater than frequency efficiencies of respective MCS levels in the first MIMO mode, as the threshold MCS level.

12. The apparatus of claim 1, wherein,
the first MIMO mode is an MIMO mode using a Spatial Diversity (SD) technique, and
the second MIMO mode is an MIMO mode using a Spatial Multiplexing (SM) technique.

13. A method for switching Multi-Input Multi-Output (MIMO) modes, the method comprising:
determining a current MIMO mode of a mobile station;
switching the MIMO mode of the mobile station to a second MIMO mode on the basis of a first staying time in a first MIMO mode when the current MIMO mode of the mobile station is the first MIMO mode, the second MIMO mode transmitting different data by antenna, and the first MIMO mode transmitting the same data through a plurality of antennas;
switching the MIMO mode of the mobile station to the first MIMO mode on the basis of an MCS level in the second MIMO mode, when the current MIMO mode of the mobile station is the second MIMO mode;
receiving a CINR value of the mobile station from the mobile station to additionally determine whether the CINR value is greater than a threshold CINR value;
switching the MIMO mode of the mobile station to the second MIMO mode when the first staying time is greater than a first threshold staying time and the CINR value is greater than the threshold CINR value; and
resetting the threshold CINR value by increasing the threshold CINR value of the mobile station by a certain value when the second staying time of the mobile station in the second MIMO mode is less than or equal to a second threshold staying time.

14. The method of claim 13, wherein the MIMO mode of the mobile station is switched to the second MIMO mode, when the current MIMO mode of the mobile station is the first MIMO mode and the first staying time of the mobile station in the first MIMO mode is greater than or equal to a first threshold staying time.

15. The method of claim 13, further comprising resetting a first threshold staying time for switching the MIMO mode of the mobile station from the first MIMO mode to the second MIMO mode, with a second staying time of the mobile station in the second MIMO mode.

16. The method of claim 13, further comprising resetting the first threshold staying time for switching the MIMO mode of the mobile station from the first MIMO mode to the second MIMO mode by increasing the first threshold staying time by a certain value, when a second staying time of the mobile station in the second MIMO mode is less than or equal to a second threshold staying time.

17. The method of claim 13, further comprising resetting the greater value of a minimum first threshold staying time and a value, which is obtained by adding a difference between a second threshold staying time and the second staying time of the mobile station in the second MIMO mode to a first threshold staying time of the mobile station in the first MIMO mode immediately before being switched to the second MIMO mode, as the first threshold staying time for switching the MIMO mode of the mobile station from the first MIMO mode to the second MIMO mode.

18. The method of claim 16, wherein the second threshold staying time is less than or equal to the first threshold staying time.

19. The method of claim 13, further comprising resetting the threshold CINR value by using the second staying time of the mobile station in the second MIMO mode, after the switching of the MIMO mode.

20. The method of claim 13, further comprising resetting the greater value of a minimum threshold CINR value and a value, which is obtained by using a difference between a second threshold staying time and the second staying time of the mobile station in the second MIMO mode to the threshold CINR value of the mobile station in the first MIMO mode immediately before being switched to the second MIMO mode, as the threshold CINR value after the switching of the MIMO mode.

21. The method of claim 13, wherein the MIMO mode of the mobile station is switched to the first MIMO mode when the current MIMO mode of the mobile station is the second MIMO mode and the MCS level of the mobile station is less than a threshold MCS level.

22. The method of claim 21, wherein the threshold MCS level is determined according to frequency efficiencies in the first and second MIMO modes.

23. The method of claim 21, wherein the threshold MCS level is determined an MCS level having a minimum frequency efficiency among MCS levels in the second MIMO mode which have frequency efficiency greater than frequency efficiencies of respective MCS levels in the first MIMO mode.

24. The method of claim 13, wherein,
the first MIMO mode is an MIMO mode using a Spatial Diversity (SD) technique, and
the second MIMO mode is an MIMO mode using a Spatial Multiplexing (SM) technique.

25. The method of claim 13, wherein the first staying time is counted with the number of Hybrid Automatic Repeat reQuest (HARQ) feedbacks transmitted from the mobile station.

* * * * *